Patented Feb. 10, 1948

2,435,792

UNITED STATES PATENT OFFICE 2,435,792

CHEMICAL PROCESS

Edward H. McArdle, Linden, and David M. Mason, Elizabeth, N. J., assignors to Standard Oil Development Company, a corporation of Delaware No Drawing. Application September 7, 1944, Serial No. 553,106

7 Claims. (Cl. 62—124)

The present invention relates to a method for the recovery of meta-xylene from crude xylene and from mixtures of hydrocarbons containing xylenes, and more particularly, the invention is concerned with the separation and purification of meta-xylene from a mixture of hydrocarbons consisting predominantly of para-xylene and meta-xylene.

The xylenes (o-, m- and p-) are principally produced as a by-product from the coking of coal and also from certain petroleum conversion and separation processes. O-xylene under atmospheric pressure boils at 144.4° C. M-xylene and p-xylene under atmospheric pressure boil at 139.2° C. and 138.5° C. respectively. It is possible, therefore, to separate o-xylene from m- and p-xylene in substantially pure form by fractional distillation. It has proved itself to be physically impossible to separate m- and p-xylenes by any distillation method heretofore known. Other physical methods, such as azeotropic distillation, percolation through active adsorbents as well as fractional release from high solvent-retentive polymers have likewise proved ineffective for the separation of m- and p-xylenes.

The only means heretofore known for the preparation of m-xylene has been by involved chemical methods which are not particularly adaptable to large scale or commercial usage.

It was heretofore known that p-xylene could be recovered from the mixture of m- and p-xylene by crystallization at temperatures below 11°. However, m- and p-xylene form a solid eutectic mixture at −58.5° C., and therefore it has been impossible to obtain all of the p-xylene from a mixture of m- and p-xylenes by fractional crystallization.

The principal object of the present invention is to secure pure or substantially pure m-xylene from a crude mixture of hydrocarbons containing both m- and p-xylene. Another object of the present invention is to recover m-xylene from a mixture of m- and p-xylene. Other and further objects will be apparent to those skilled in the art upon reading the following description.

It has now been found that, after the removal of o-xylene from a mixture of xylene isomers by fractional distillation, by conducting the crystallization of p-xylene in the presence of a relatively volatile diluent having a freezing point lower than that of the meta/para-xylene eutectic and removing the crystallized p-xylene by filtration, enough of the p-xylene can be crystallized out so that upon subsequent crystallization, after the removal of diluent, only m-xylene crystals are formed. The meta/para-xylene eutectic forms in the ratio of about 88 parts m-xylene to about 12 parts of p-xylene or, in other words, 7⅓ parts of m-xylene per part of p-xylene. Therefore, in any mixture of m- and p-xylene in which the m-xylene exceeds the p-xylene by a ratio greater than 7⅓:1, the m-xylene will crystallize first on cooling. Diluents or solvents applicable for the purpose of this invention include methyl alcohol, ethyl alcohol, isopropyl alcohol, and the like; aceton and methyl ethyl ketone; toluene; various aliphatic hydrocarbons, such as n-pentane, isopentane, pentenes, butenes, such as butene-1, butanes, propane, propylene, ethane, and ethylene, although it is preferred to use ethane or ethylene. Any similar material having a melting point below that of the meta/para-xylene eutectic may be used. Although from one-fifth volume to 2 volumes or more of diluent per volume of meta/para-xylene mixture can be used depending upon the type of diluent, it is preferred to use from about one-third volume of diluent per volume of meta/para-xylene to one volume of diluent per volume of mixed xylenes.

In general, according to the present invention, an aromatic fraction boiling between 136° C. and 144° C. obtained during the processing of petroleum oil or a similar fraction of high xylene content secured as a distillate of coke oven gases or any equivalent source, is again fractionated taking overhead a fraction boiling between 138° C. and 141° C., consisting predominantly of m- and p-xylene. Any of the distillations necessary in carrying out the process of the present invention can be accomplished by the use of available distillation equipment. The fraction boiling between 138–141° C. is then placed in a vessel designed for carrying out crystallization and cooling manipulative steps. This equipment may be in the form of a jacketed kettle equipped with a stirrer and the proper connection for introducing the cooling medium into the jacketed part of the kettle. From one-fifth to two volumes of diluent per volume of distillate is then added to the kettle. Where the diluent is a highly volatile liquid, it is preferred to use a closed crystallization apparatus so as to prevent the loss of diluent. A cooling medium, such as ethylene or other refrigerant, is then introduced into the jacketed part of the apparatus and the mixture is cooled to a temperature below −58° C. but not to the point where the mass completely solidifies. This temperature will depend for the most part upon the nature of the diluent used. During the cooling process crystals of p-xylene will form down to the temperature at which the complete mass solidifies. Before such solidification occurs, cooling is discontinued and the temperature of the mass is maintained at a few degrees above the temperature at which the mass completely solidifies.

Alternatively, auto-refrigeration can be used, wherein the diluent also acts as the refrigerant for the process. After charging the meta/para-xylene mixture to a suitable container, such a diluent as ethane or ethylene is introduced in sufficient quantity and under such pressure that throughout the period of cooling, the volume of diluent present never falls below one-fifth that of the volume of the mixed xylenes; and the temperature is always maintained above that of complete solidification.

The p-xylene crystals are then removed by filtration. This filtration can be accomplished either by a basket type centrifuge or by means of a suction filter. Any other convenient means of separating the p-xylene crystals from the liquid can be used. After removal of the p-xylene crystals, either all or a substantial part of the diluent is distilled off and condensed for re-use if desired.

After removal of the diluent, the residual liquid consisting predominantly of m-xylene is again cooled to about $-50°$ C. to $-56°$ C. During this cooling, crystals of m-xylene are formed and may be removed from the residual liquid by filtration as before. The residual liquid, after the removal of the m-xylene crystals, may be recycled to the first step in the process or otherwise disposed of. Operating in this manner, m- and p-xylene of substantially 99% or more purity can be produced.

The details of the invention will be better understood from the following examples given for the purpose of illustration:

*Example 1*

1 volume of mixed meta/para-xylenes (21% para, 71% meta, 8% other C$_8$ aromatics) and 1 volume of n-pentane were introduced into a jacketed cooler. Liquid ethylene was permitted to evaporate in the jacket of the cooler and the mixture was cooled to $-70°$ C. At $-70°$ C. the para crystals which had formed were removed by basket centrifuging. 70% of the original p-xylene present in the mixed xylene liquid was thus removed as substantially pure para-xylene. The filtrate was then freed from the n-pentane by fractional distillation. The residue, now rich in m-xylene, was then cooled to $-52°$ C. and filtered. Approximately 27% of the m-xylene present in the original mixed xylenes was recovered as substantially pure m-xylene.

*Example 2*

1 volume of mixed xylenes of the same composition as used in Example 1 was mixed with 2 volumes of i-pentane, cooled to $-85°$ and filtered as in Example 1. 91% of the p-xylene was recovered in crystalline form. The i-pentane was then removed by distillation. The residual liquid was then cooled to $-56°$ C. and filtered. 56.5% of the m-xylene present in the original mixed xylenes was obtained.

*Example 3*

2 parts of volume of the mixed xylenes of the same composition as used in Example 1 mixed with 1 part by volume of iso-pentane (2-methyl butane), were placed in a closed, jacketed cooler, cooled to $-83°$ C. and filtered. Super-cooling occurred below $-73°$ C. 90% of the p-xylene was filtered off as crystals. The filtrate was then freed from the iso-pentane by distillation. After removal of the diluent the liquid was then again cooled to $-56°$ C. for crystallization of m-xylene and filtered. About 55% of the m-xylene originally present in the mixed xylenes was thus produced.

What is claimed is:

1. The method of separating para-xylene in substantially pure form from a mixture thereof with meta-xylene, which comprises forming a liquid solution of a mixture of meta and para-xylenes, said mixture containing a higher proportion of para-xylene than is present in its eutectic with meta-xylene, with a diluent having a freezing point lower than that of said eutectic, thereafter cooling said solution to a temperature substantially below the eutectic point of said xylenes per se and thereby precipitating substantially pure para-xylene crystals from the solution of the xylenes and diluent, removing the para-xylene crystals from the remaining solution, leaving the meta-xylene in solution in a proportion substantially higher than is present in the eutectic with para-xylene.

2. The method of producing meta-xylene and para-xylene, each in substantially pure form, which comprises forming a liquid solution of a mixture of meta and para-xylenes, said mixture containing a higher proportion of para-xylene than is present in its eutectic with meta-xylene, with a diluent having a freezing point lower than that of said eutectic, thereafter cooling said solution to a temperature substantially below the eutectic point of said xylenes per se and thereby precipitating substantially pure para-xylene crystals from the solution of the xylenes and diluent, removing the para-xylene crystals from the remaining solution, evaporating the diluent from the remaining solution to leave a liquid which contains a higher proportion of meta-xylene than is present in the eutectic mixture of the xylenes, again cooling the remaining liquid to a temperature at which the meta-xylene crystallizes but above the eutectic temperature of the xylenes, and separating the meta-xylene crystals from the remaining liquid.

3. The method of producing meta-xylene and para-xylene, each in substantially pure form, which comprises forming a liquid solution of a mixture of meta and para-xylenes containing above 12% para-xylene and below 88% meta-xylene with a diluent having a freezing point below $-60°$ C., thereafter cooling the mixture to a temperature substantially below $-58°$ C. and thereby precipitating substantially pure para-xylene crystals from the solution of diluent and liquid xylenes, removing the para-xylene crystals, evaporating the diluent from the remaining liquid xylenes which contain substantially more than 88% meta-xylene, again cooling the remaining liquid xylenes to a low temperature at which the meta-xylene crsytallizes but not below $-58°$ C., and separating the meta-xylene crystals.

4. The method according to claim 1 in which the amount of diluent employed is ⅕ to 2 volumes per volume of meta and para-xylene mixture.

5. The method according to claim 4 in which the diluent is isopentane and in which the solution of isopentane and mixture of meta and para-xylenes is cooled to a temperature of the order of −82° C. to −85° C.

6. The method according to claim 4 in which the diluent is ethane.

7. The method according to claim 4 in which the diluent is ethylene.

EDWARD H. McARDLE.
DAVID M. MASON.

REFERENCES CITED

The following references are of record in the file of this patent:

UNITED STATES PATENTS

| Number | Name | Date |
|---|---|---|
| 1,940,065 | Spannagel et al. | Dec. 19, 1933 |
| 2,383,174 | Weir | Aug. 21, 1945 |